Feb. 22, 1938.   C. W. FLOSS   2,109,007
TRANSMISSION
Filed Sept. 27, 1935   2 Sheets-Sheet 1
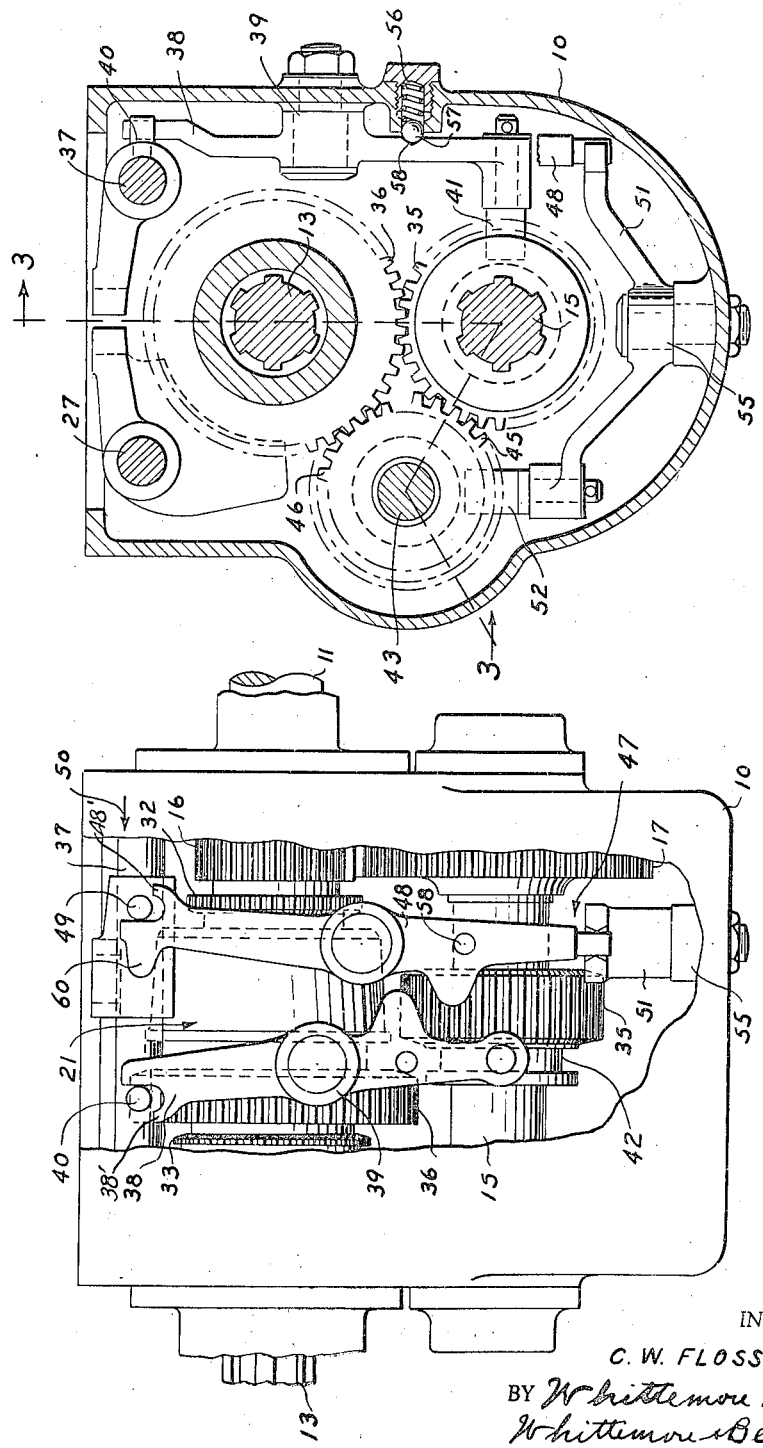
INVENTOR.
C. W. FLOSS
BY Whittemore Hulbert
Whittemore & Belknap
ATTORNEY Patented Feb. 22, 1938

2,109,007

UNITED STATES PATENT OFFICE 2,109,007

TRANSMISSION

Carl W. Floss, Detroit, Mich.

Application September 27, 1935, Serial No. 42,497

4 Claims. (Cl. 74—473)

This invention relates generally to power transmitting mechanism, and refers more particularly to improvements in transmissions of the variable selective speed type.

One of the principal objects of the present invention consists in appreciably reducing the overall length and weight of a transmission embodying mechanism rendering it possible to selectively secure a plurality of different speeds. With the present invention, a transmission embodying the same number of speed changes as employed in transmissions heretofore used in standard practice, may be housed within a space of considerably less area than the space required for accommodating the change speed gearing in the aforesaid conventional types of transmissions, and this may be accomplished in accordance with this invention, without sacrificing rigidity or departing from the accepted operating principles.

Another advantageous feature of the present invention consists in the provision of a variable speed transmission of the character set forth in the preceding paragraph, wherein the weight of the rotating masses is substantially less than in the conventional types of variable speed transmissions heretofore commercially employed. This latter feature is of particular importance when mechanism is employed in the transmission to synchronize the change speed gears prior to meshing the same, since it greatly facilitates synchronization.

Another advantageous feature of the invention which contributes materially to securing the foregoing results, resides in the provision of a variable speed transmission embodying change speed gearing, wherein the low speed gear is selectively actuated to secure both high and second speeds.

A further object of the present invention resides in the provision of a variable speed transmission equipped with mechanism so designed as to provide for securing both low and reverse by the actuation of only one shift rail.

In addition to the foregoing, the present invention contemplates a variable speed transmission embodying change speed gearing capable of being selectively actuated to secure the various speeds by the standard shifting movement and by the use of only two shift rails.

The foregoing, as well as other objects, will be made more apparent as this description proceeds, especially when considered in connection with the accompanying drawings, wherein:

Figure 1 is a side elevational view, partly in section, of a variable speed transmission constructed in accordance with this invention;

Figure 2 is a cross-sectional view taken substantially on the line 2—2 of Figure 3;

Figure 3:
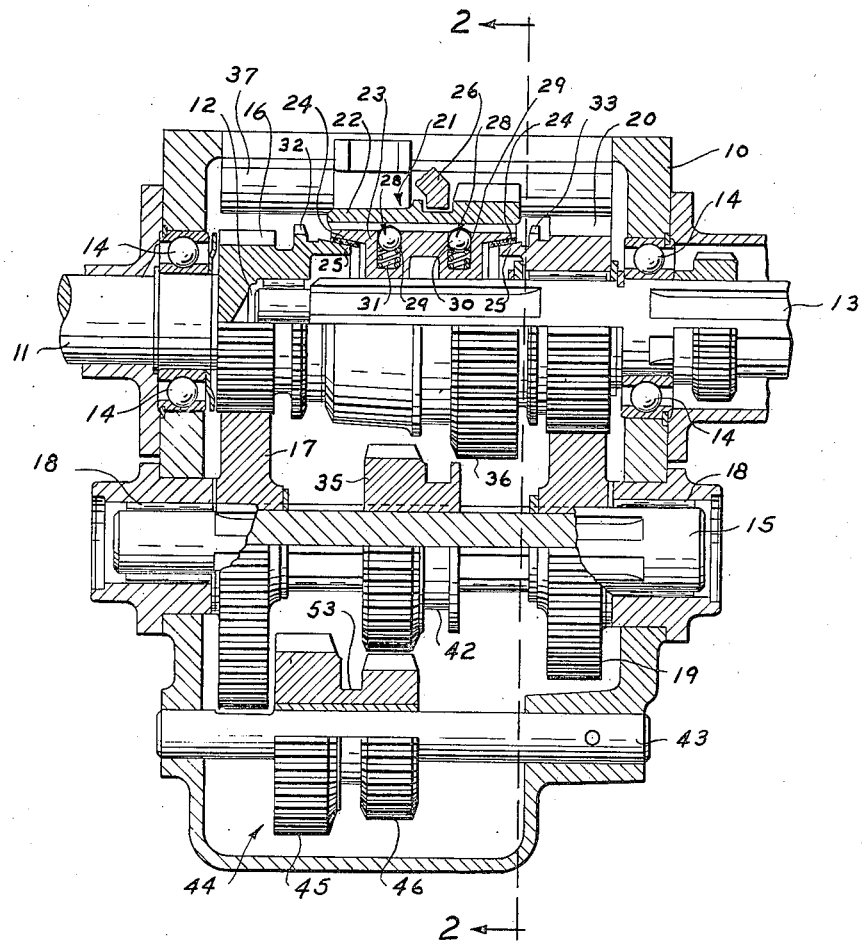
Figure 3 is a sectional view taken substantially on the line 3—3 of Figure 2.

For the purpose of illustration, I have shown in the several figures of the drawings, a variable selective speed transmission embodying change speed gearing arranged to provide three different forward speeds and one reverse speed. This general type of variable speed transmission has been used as standard equipment in the power transmitting mechanism of motor vehicles for a number of years and, as a matter of fact, is still the most popular type of transmission in use at the present time. The present invention contemplates reducing the size, weight and cost of transmissions of the above general character without interfering with the principle of operation thereof and without sacrificing rigidity.

Referring now more in detail to the particular construction shown in the several figures of the drawings for the purpose of illustration, it will be noted that the reference character 10 designates a transmission case adapted to completely house the change speed gearing and having a removable cover at the upper end thereof through which access may be had to the mechanism within the case. Journaled in the front wall of the case in any suitable manner is a drive shaft 11 having the forward end thereof extending beyond the case for connection with the prime mover (not shown) and having the rear end thereof counterbored to provide a recess 12 within which the forward end of the transmission shaft 13 is journaled. The rear end of the transmission shaft extends through the rear wall of the case for connection with the propeller shaft (not shown) of the driving mechanism, and is journaled in the rear wall of the case by means of a ball bearing 14.

The drive shaft 11 of the transmission mechanism is operatively connected to the countershaft 15 through the medium of gearing embodying gear teeth 16 formed on the shaft 11 adjacent the rear end thereof and meshing with the teeth of a gear 17 fixed to the countershaft. With this construction, it will be apparent that the countershaft is constantly driven by the drive shaft 11, and it will be observed from Figure 3 that the opposite ends of the countershaft are respectively journaled in the front and rear walls of the case by roller bearings, designated generally herein by the reference character 18.

Secured to the countershaft 15 adjacent the rear end thereof is a second speed gear 19 arranged in constant mesh with a cooperating second speed gear 20 freely rotatably mounted upon the transmission shaft 13. The second speed gear 20 is adapted to be fixed to the transmission shaft 13 for the purpose of driving the latter from the drive shaft at an intermediate speed by a low speed gear unit 21 splined upon the transmission shaft between the second speed gear 20 and the countershaft driving gear 16 on the drive shaft 11.

The low speed gear comprises two concentrically arranged sections designated generally in Figure 3 by the reference characters 22 and 23. The inner section 23 is directly splined upon the transmission shaft 13 and is provided at its opposite ends with outwardly tapered annular clutch surfaces 24. The clutch surfaces 24 are designed to respectively engage corresponding clutch surfaces 25 on the rear end of the drive shaft 11 and at the forward end of the second speed gear 20 upon movement of the section 23 of the low speed gear in opposite directions axially of the transmission shaft 13. As will be presently described, the aforesaid clutch surfaces cooperate to synchronize the speed of rotation of the inner section 23 with the speed of rotation of the drive shaft 11 and the intermediate or second speed gear 20.

The outer section 22 of the low speed gear 21 is shown in Figure 3 as splined upon the inner section 23 for axial shifting movement relative thereto, and this movement of the outer section 22 is effected by means of a shifting fork 26 through the medium of a shifter rail 27.

Referring again to Figure 3, it will be noted that the outer section 22 of the low speed gear 21 is frictionally connected to the inner section 23 through the medium of spring pressed detents 28. In detail, two sets of axially spaced recesses 29 are formed in the inner section 23 at predetermined intervals circumferentially of the section for receiving balls 30 normally urged into frictional engagement with the splines on the outer section 22, through the medium of springs 31 housed within the recesses. With the above arrangement, it will be apparent that initial movement of the outer section 22 of the low speed gear 21 in a forward direction effects a corresponding movement of the inner section 23, through the medium of the spring pressed detents 28 and serves to engage the clutch surface 24 on the front end of the inner section 23 with the cooperating clutch surface 25 at the rear end of the drive shaft 11 to synchronize the speed of rotation of the drive shaft and the low speed gear. Continued axial movement of the outer section 22 in a forward direction is effected relative to the inner section, and serves to engage the splines on the outer section with the series of teeth 32 formed on the drive shaft 11 in rear of the teeth 16. Of course, engagement of the splines on the outer section 22 of the low speed gear 21 with the teeth 32 on the drive shaft, directly connects the transmission shaft 13 with the drive shaft, and in this manner the transmission shaft is rotated at high speed. On the other hand, when the shifter rail 27 is moved in a rearward direction, both sections of the low speed gear 21 are moved in a corresponding direction to engage the clutch surface 24 at the rear end of the inner section 23 with the cooperating clutch surface 25 on the forward end of the second speed gear 20, and upon continued rearward movement of the shifter rail 27, the outer section 22 of the low speed gear moves rearwardly relative to the inner section 23 to engage the splines with a corresponding series of teeth 33 formed on the second speed gear. When the splines on the outer section 22 of the low speed gear 21 mesh with the series of teeth 33 on the second speed gear, the latter is positively connected to the transmission shaft 13 and the latter is rotated at an intermediate speed from the drive shaft 11 through the countershaft 15.

It will be apparent from the foregoing that the weight of the rotating mass to be synchronized in either of the foregoing speeds, is relatively small and as a consequence, synchronization is highly effective. The efficiency of the synchronization in the above construction is also greatly improved by reason of the fact that the present design renders it possible to employ at least two series of spring pressed detents and, consequently, failures experienced in the past, resulting from rupture of the springs associated with the detents, are materially minimized.

In addition to securing intermediate and high speeds, the present type of transmission mechanism is also capable of securing a low speed and a reverse. Referring first to the manner in which low speed is secured, attention is directed to Figure 3, wherein a gear 35 is splined upon the countershaft 15 between the gears 17 and 19 for axial sliding movement relative to the shaft. The gear 35 is movable into mesh with a series of teeth 36 on the outer section 22 of the low speed gear 21, when the latter gear is in its neutral position with respect to the second speed gear 20 and high speed gear 22, to drive the driven shaft through the transmission shaft 13 at a low speed. The gear 35 is shifted into and out of mesh with the teeth 36 on the low speed gear through the medium of a shifter rail 37 mounted for reciprocation upon the transmission case and connected to the gear 35 through the medium of a lever 38. As shown particularly in Figure 2, the lever 38 is pivotally supported intermediate the ends thereof upon a pin 39 for swinging movement about a horizontal axis perpendicular to the axes of the shafts in the transmission. The upper end of the lever 38 is positioned at the front side of an abutment or pin 40 extending laterally outwardly from the rail 37 to engage the upper extremity of the lever 38 upon sliding the rail 37 forwardly. The lower end of the lever 38, on the other hand, is provided with a lateral extension 41 adapted to engage within an annular groove 42 formed in the hub of the low speed gear 35. The arrangement is such that when the rail 37 is moved in a forward direction from its neutral position, the pin 40 engages the upper extremity of the lever 38 and rocks the same about the axis of the pin 39. Of course, the lower end of the lever 38 will move rearwardly to shift the low speed gear 35 on the countershaft 15 into mesh with the teeth 36 on the low speed gear 21.

For the purpose of rotating the transmission shaft in a reverse direction through the transmission, the latter is provided with a reverse gear idler shaft 43 suitably mounted in the transmission case and having a double reverse idler gear 44 mounted thereon for both rotation and sliding movement relative thereto. The double reverse idler comprises essentially two gears designated in Figure 3 by the reference characters 45 and 46. These gears are integrally connected and are actuated as a unit from the rail 37 through the medium of the shift mechanism designated generally in Figure 1 by the reference character 47. This shift mechanism comprises a lever 48 pivotally mounted upon the transmission case in front of the lever 38. The upper end of the lever 48 is adapted to be engaged by an abutment or pin 49, similar to the pin 40 in that it extends laterally outwardly from the rail 37 at the front side of the upper extremity of the lever 48, so that when the rail 37 is shifted rearwardly or in the direction of the arrow 50 in Figure 1, the abutment 49 will engage the upper extremity of the lever 48 and swing the latter about the axis of the pivotal connection of the case. It will be understood from Figure 1, that when the shifter rail 37 is moved in a rearward direction or in the direction of the arrow 50, the pin 40 merely travels away from the lever 38, while on the other hand, when the rail 37 is shifted forwardly to actuate the lever 38, the pin 49 merely travels away from the lever 48. As shown in Figure 2, the extreme lower end of the lever 48 engages one end of a second lever 51, while the opposite end of this lever is provided with a shifting fork 52 adapted to engage in the annular groove 53 provided between the two reverse idler gears 45 and 46. The construction is such that when the lower end of the lever 48 is swung in a forward direction by sliding movement of the rail 37 in the direction of the arrow 50, the shifting fork 52 will be moved in a rearward direction by the lever 51 to mesh the gear 45 with the gear 35 and to mesh the gear 46 with the teeth 36 on the low speed gear 21. For accomplishing the above result the lever 51 is pivotally mounted as at 55 upon the lower wall of the transmission case for swinging movement about a vertical axis arranged in a common plane with the horizontal axes of the counter and transmission shafts.

In order to avoid over-shifting of the rail 37 and to insure accurate positioning of the levers 38 and 48 in their several positions of adjustment, I provide a spring pressed detent in association with each lever. Both of the detents may be identical in construction and, accordingly, only one will be described. Referring again to Figure 2, it will be noted that the spring pressed detents 56 are carried by the side wall of the case and comprise a spring pressed ball 57 adapted to frictionally engage in suitable pockets 58 formed in the lever 38. The pockets 58 are so positioned in the lever 38 that when this lever is in either neutral or operative position the spring pressed ball 57 engages in either one or the other of the pockets. As indicated above, the same type of detent is provided for the lever 48, and, accordingly, both of these levers are accurately located in both the neutral and operative positions thereof. In this connection, attention may also be called to the rearwardly extending projection 60 formed on the upper extremity of the lever 48, since this projection serves to engage the front side of the lever 38 when the transmission is in reverse, and thereby forms a stop which prevents movement of the low speed gear 35 when the reverse gearing is engaged.

Upon reference to Figure 1, it will be noted that the abutment 40 on the shifter rail 37 is positioned to the left of a vertical plane including the axis of pivotal movement of the lever 38, and the abutment 49 is positioned to the right of a vertical plane including the axis of swinging movement of the lever 48. This relationship is provided to enable the abutments to cooperate with the hook-like projections 38' and 48' on the levers 38 and 48, respectively, to return these levers to their neutral positions. In this connection, it will be observed that as the abutment 40 engages the upper extremity of the lever 38 to swing the latter to the right, the hook-like projection 38' moves upwardly due to the geometrical relationship previously referred to. In actual practice, the hook-like projection 38' moves to a position in engagement with the left side of the abutment 40 when the rail is moved in a forward direction, and consequently, return movement of the rail causes the abutment to engage the hook-like projection and effect sufficient return movement of the lever 38 to permit the spring pressed detent 56 to complete this return movement and accurately position the lever 38. The same operation holds true in connection with the lever 48 by reason of the cooperation between the hook-like projection 48' and the abutment 49.

*Operation*

Assuming that the several parts of the variable speed transmission are in neutral and that it is desired to engage the low speed gearing; the rail 37 is moved in a forward direction to engage the abutment 40 with the upper extremity of the lever 38 and thereby swing the lower end of the lever in a rearward direction to shift the low speed gear 35 on the countershaft 15 rearwardly into mesh with the series of teeth 36 on the low speed gear 21 carried by the transmission shaft 13. During this operation, the abutment 49 merely travels away from the upper extremity of the lever 48 and as a consequence the aforesaid shifting movement of the rail 37 has no effect whatsoever on the mechanism controlled by the lever 48.

Assuming now that it is desired to rotate the transmission shaft at the intermediate speed; the shift rail 27 is moved rearwardly to effect a corresponding sliding movement of the low speed gear 21. As previously stated, initial rearward movement of the low speed gear unit effects synchronization of the speed of rotation of the low speed gear 21 and the second gear 20 through the medium of the cooperating clutch surfaces on the inner section 23 of the low speed gear and on the front end of the intermediate speed gear 20. Continued rearward movement of the low speed gear 21 causes the outer section 22 of this gear to move relative to the inner section into mesh with the teeth 33 on the intermediate gear 20. This, of course, secures the intermediate speed gear 20 to the transmission shaft, and the latter is driven at the desired speed from the drive shaft 11 through the countershaft and associated gears 16, 17, and 19.

From intermediate speed the transmission is usually shifted into high or direct drive, and this is accomplished in the present instance by moving the shift rail 27 forwardly. Forward movement of the shift rail 27 effects a corresponding movement of the low speed gear 21 and during the initial portion of this movement, the inner section 23 of the low speed gear unit effects synchronization of the speed of rotation of the gear 32 on the drive shaft 11 and the outer section 22 of the low speed gear. Continued forward movement of the low speed gear causes the outer section to move relative to the inner section into mesh with the gear teeth 32, and thereby directly connects the drive shaft 11 with the transmission shaft 13.

In the event it is desired to rotate the transmission shaft in a reverse direction, the shift rail 37 is again operated, but in this case is moved in a rearward direction designated by the arrow 50 in Figure 1. Movement of the rail 37 in the above direction effects a rearward displacement of the double reverse idler 44 on its shaft 43 through the medium of the levers 48 and 51. As will be apparent from Figure 3, rearward movement of the double reverse idler from the neutral position thereof meshes the gear 45 of the idler with the low speed gear 35 and meshes the gear 46 of the idler with the teeth 36 on the low speed gear 21. As previously stated, the abutment 40 on the shift rail 37 is moved away from the lever 38 during the aforesaid operation, and displacement of the latter is prevented by reason of the fact that the extension 60 on the lever 48 acts as a stop for the lever 48.

Thus from the foregoing, it will be apparent that I have provided a relatively simple variable speed transmission of the selective shift type composed of the minimum number of parts capable of being housed in a space considerably smaller than transmissions of the type heretofore employed. It will also be observed that my improved transmission is extremely light in weight, due to the elimination of a number of parts heretofore thought necessary in transmissions of this general character and, as a consequence, is capable of being inexpensively manufactured. It will further be apparent that I have achieved all of the foregoing advantageous features without departing radically from standard practice insofar as operation of the transmission is concerned, and without sacrificing rigidity in construction. In addition, it will be apparent that I have actually improved the performance of the transmission, in that the relatively low weight of the rotating masses and the possibility of using a greater number of synchronizer springs materially increases the effectiveness of synchronization.

What I claim as my invention is:

1. Mechanism for shifting gears in a variable speed transmission comprising, a shift rail supported for axial sliding movement in opposite directions, a lever supported intermediate its ends for swinging movement and having one end operatively connected to a sliding gear in the transmission, a second lever supported for swinging movement intermediate its ends and also having one end operatively connected to a sliding gear in the transmission, an abutment on said shift rail positioned for engagement with the free end of the first lever upon movement of the rail in one direction to swing said lever in a direction to actuate the slidable gear connected thereto, and a second abutment on said shift rail engageable with the free end of the second named lever upon movement of the rail in the direction opposite the one aforesaid to swing said second lever in a direction to actuate the slidable gear operatively connected thereto.

2. Mechanism for shifting slidable gears of a variable speed transmission comprising, a shift rail supported for axial sliding movement in opposite directions, a lever pivotally supported intermediate its ends and having one end operatively connected to a slidable gear, an abutment upon said shift rail effective upon movement of the rail in one direction to engage the free end of said lever and to swing the lever in a direction to actuate the shiftable gear connected thereto, means for returning said lever to its neutral position upon movement of the rail in the opposite direction and to permit continued movement of said rail in the latter direction relative to the lever, a second lever pivotally supported intermediate its ends for swinging movement and having one end operatively connected to a slidable gear for actuating the same, a second abutment on the shift rail effective upon movement of the rail in the second named direction thereof to swing said second lever in a direction to actuate the gear connected thereto, and means for returning the second lever to its neutral position upon movement of the shift rail in its first named direction and to permit continued movement of said rail in the latter direction relative to said second lever.

3. Mechanism for shifting slidable gears in a variable speed transmission comprising, a shift rail supported for axial sliding movement in opposite directions, a lever pivotally supported intermediate its ends for swinging movement and having one end operatively connected to a slidable gear, an abutment on the shift rail effective upon movement of the rail in one direction to engage the free end of said lever and to swing the latter in a direction to actuate the sliding gear, means on the free end of the lever cooperating with the abutment to return the lever to its neutral position upon sliding movement of the shift rail in the opposite direction and to permit continued movement of said rail in the latter direction relative to said lever, a second lever pivotally supported intermediate its ends and having one end operatively connected to another slidable gear, a second abutment on the shift rail effective upon movement of the rail in the second named direction to engage the free end of the second lever and to swing the latter in a direction to operate the gear connected thereto, and means on the second lever cooperating with the second abutment upon shifting the rail in the first named direction to return the second lever to its neutral position and to permit continued movement of the rail in the first named direction relative to the second lever.

4. Mechanism for shifting slidable gears in a variable speed transmission comprising, a rail supported for sliding movement in opposite directions, a lever pivotally supported intermediate its ends for swinging movement and having one end operatively connected to a slidable gear, an abutment on the rail effective upon movement of said rail in one direction to engage the free end of the lever and to swing the lever in a direction to actuate the slidable gear, a second lever pivotally supported intermediate its ends for swinging movement and having one end operatively connected to a third lever pivotally supported intermediate its ends with the free end thereof connected to another slidable gear in the transmission, and a second abutment on the shift rail effective upon movement of the latter in the opposite direction to engage the free end of the second lever and to swing the latter in a direction to actuate the slidable gear connected to said third named lever.

CARL W. FLOSS.